United States Patent [19]
Hatouchi et al.

[11] Patent Number: 5,161,698
[45] Date of Patent: Nov. 10, 1992

[54] APPARATUS FOR STORING ARTICLES

[75] Inventors: Gokichi Hatouchi, Komaki; Yoshihiro Kaneda, Shiga; Masahiro Enomoto, Ohmihachiman, all of Japan

[73] Assignee: Daifuku Co., Ltd., Japan

[21] Appl. No.: 829,495

[22] Filed: Feb. 3, 1992

[30] Foreign Application Priority Data

Aug. 21, 1991 [JP] Japan .................................. 3-208346
Sep. 3, 1991 [JP] Japan .................................. 3-222577

[51] Int. Cl.⁵ .............................................. A47F 5/00
[52] U.S. Cl. .................................... 211/122; 211/1.56
[58] Field of Search ........................... 211/1.51–1.56, 211/122

[56] References Cited

U.S. PATENT DOCUMENTS

| | | | |
|---|---|---|---|
| 4,531,789 | 7/1985 | Iemura et al. | 211/122 X |
| 4,574,962 | 3/1986 | Tabler et al. | 211/122 |
| 4,821,887 | 4/1989 | Iemura et al. | 211/122 X |
| 5,065,872 | 11/1991 | Simon | 211/122 |

FOREIGN PATENT DOCUMENTS

3102510 10/1991 Japan .

Primary Examiner—Ramon O. Ramirez
Assistant Examiner—Sarah A. Lechok
Attorney, Agent, or Firm—Barnes, Kisselle, Raisch, Choate, Whittemore & Hulbert

[57] ABSTRACT

An article storing apparatus including rotary storing units having an elongate endless transport path formed on a long frame-shaped base. Elongate, endless inner and outer support devices are provided on the base, with an endless clearance defined between the inner and outer support devices. Below the inner support device are provided a travel element disposed in corresponding relation to the clearance and drive mechanism for driving the travel element. A plurality of article support elements of disc shape are supported over the inner and outer support devices. Individual article support elements are connected to the travel element by coupling members passing through the clearance. A plurality of storing units are arranged in parallel, and corner portions of each storing unit at one end thereof are formed as an article receiving/discharging station.

4 Claims, 13 Drawing Sheets

APPARATUS FOR STORING ARTICLES

FIELD OF THE INVENTION

The present invention relates to an apparatus for storing articles and, more particularly, to an article storing apparatus including a rotary storing unit capable of storing a plurality of roll-shaped articles held upright and adapted to permit a desired one of the articles to be positioned at a receiving/discharging station for delivery outward and, conversely, for entry into storage, as required.

BACKGROUND OF THE INVENTION

A typical example of such rotary storing unit for use in this type of article storing apparatus is described in Japanese Utility Model Laid-Open Publication No. 3-102510, wherein an elongate transport path is formed on a long frame-shaped base by means of a multiplicity of idler rollers arranged thereon, there being provided a plurality of pallets movable on the transport path. The storing unit includes an endless chain trained over a plurality of wheels and extending along the transport path, and a motor for driving the wheels, individual pallets being geared at their respective centers to the endless chain.

In this known arrangement, a control switch is provided on the base side such that the switch is manually operated to actuate the motor to drive the endless chain. As the endless chain is driven, the plurality of pallets are caused to move on the transport path so that a target pallet may be brought to a position opposite to the receiving/discharging station. Thus, loading and unloading of an article relative to the target pallet can be performed by means of a fork lift truck.

However, with the known arrangement, wherein individual pallets are connected at their respective centers directly to link pins of the endless chain, one drawback is that each pallet and the endless chain are disposed close to each other and accordingly each of the wheels must have its top surface positioned in close proximity to a conveyor bearing surface consisting of the article supporting surface of the idler rollers. As such, in order that the wheels may be properly mounted in position, the idler rollers must be arranged in such a way that no idler roller is present at locations where idler rollers may interfere with the wheels. Because of the presence of such locations, therefore, vibrations may occur with pallets being conveyed, with the result that stable and smooth transport of articles cannot be effected. Another drawback is that the elongate transport path, which comprises a pair of straight portions and a pair of rotary portions interconnecting the ends of the straight portions, necessitates pallets being spaced wide apart while in movement on the straight portions in order to prevent the pallets from interfering with one another on the rotary portions, thus involving a considerable dead space.

SUMMARY OF THE INVENTION

It is a primary object of the invention to provide an article storing apparatus including a rotary storing unit capable of constantly performing stable and smooth transport of articles.

In order to accomplish this object, according to the invention there is provided an apparatus for storing articles including rotary storing units having an elongate endless transport path formed on a long frame-shaped base, comprising:

a plurality of said storing units arranged in parallel, each having corner portions at one end of its elongate structure which are formed as a receiving/discharging station, each storing unit including:

inner support means provided on the upper surface of said base and defining a first endless transport path, outer support means provided on the upper surface of said base and extending along the outer periphery of the inner support means, said outer support means defining a second endless transport path, an endless clearance defined between said inner support means and said outer support means, drive means disposed below said support means, an endless movable member provided below said support means at a position corresponding to said clearance and adapted to be driven by said drive means, a plurality of article support elements supported on said inner and outer support means, and means connecting said article support elements and said movable member through said clearance.

According to the above described arrangement of the invention, the drive means is actuated to move the travel element, whereby the article support elements connected to the travel element through the connecting means are caused to move on the inner and outer endless support means. The drive means and travel element are disposed below the support means, and the travel element and article support elements are connected through the clearance between the inner and outer support means; and therefore the inner and outer support means extend along the transport path without involving any cause of interruption. Accordingly, individual article support elements can be moved so that they are less subject to vibration, it being thus possible to allow articles to be transported in stable and smooth manner at all times.

In a preferred embodiment of the invention, the article support elements are supported by the inner and outer support means over respective full widths thereof, the width of the outer support means being greater than the width of the inner support means, each of the article support elements being connected to said travel element at a position located more inward of said transport path than the center of the article support element.

According to such arrangement, at the corner portions formed as a receiving/discharging station, adjacent article-supporting elements can be sufficiently spaced apart from each other. This permits accurate and smooth entry into and delivery from storage as desired. Furthermore, on the elongate transport path, except the end portions thereof which include the corner portions, it is possible to minimize the distance between adjacent article-supporting elements, so that the entire apparatus can be made compact in construction while attention is directed toward improvement in article storing efficiency. The arrangement also permits a warehousing fork lift truck to perform loading and unloading operations from a direction oblique to the transport path without assuming a position that is in line therewith. Therefore, the passage for movement of the fork lift truck can be set relatively narrow.

In a preferred embodiment of the invention, the apparatus further comprises switching means provided in each of the storing units for switching the drive means in the storing unit, means for feeding power to drive means in a predetermined number of said storing units through respective switching means of said predetermined number of storing units, and control means for operating the switching means of one of said predetermined number of storing units to actuate the drive means of said one storing unit only.

According to such arrangement, only one storing unit is driven for each predetermined number of storing units, so that the capacity of power supply for the enire apparatus can be minimized, it being thus possible to reduce the cost of the apparatus.

DESCRIPTION OF THE PREFERRED EMBODIMENTS

Figure 1:
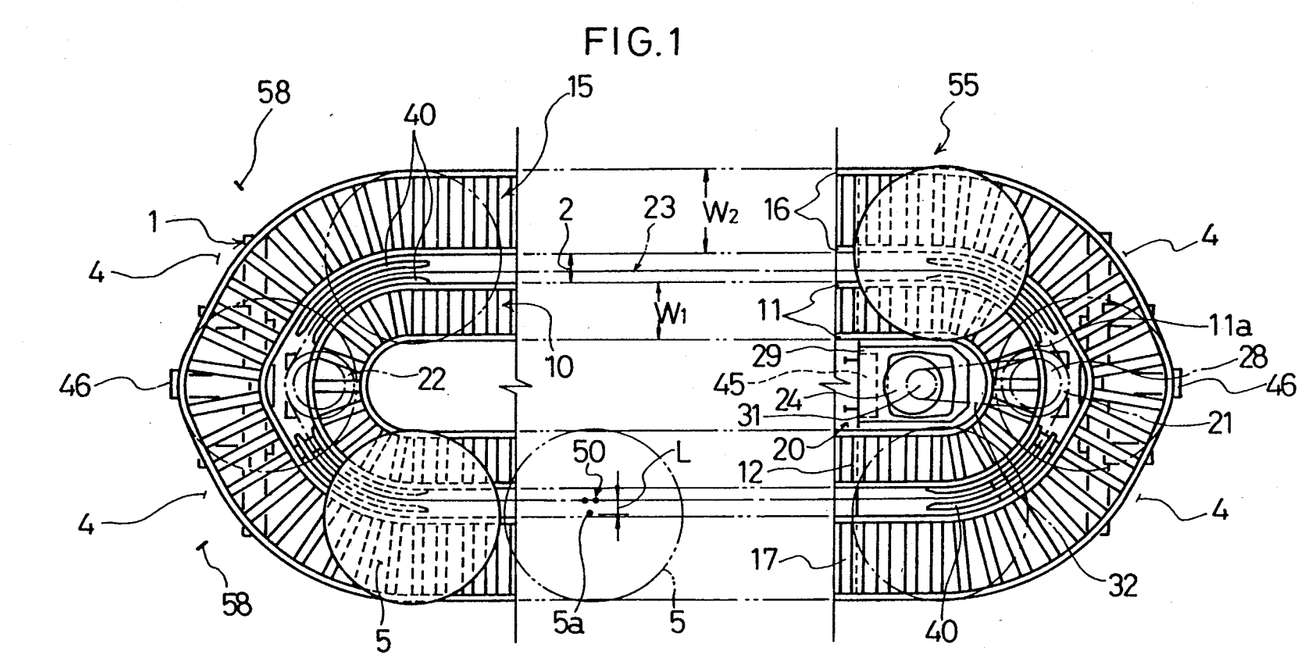
FIG. 1 is a plan view of a storing unit in one embodiment of the invention.
Figure 2:
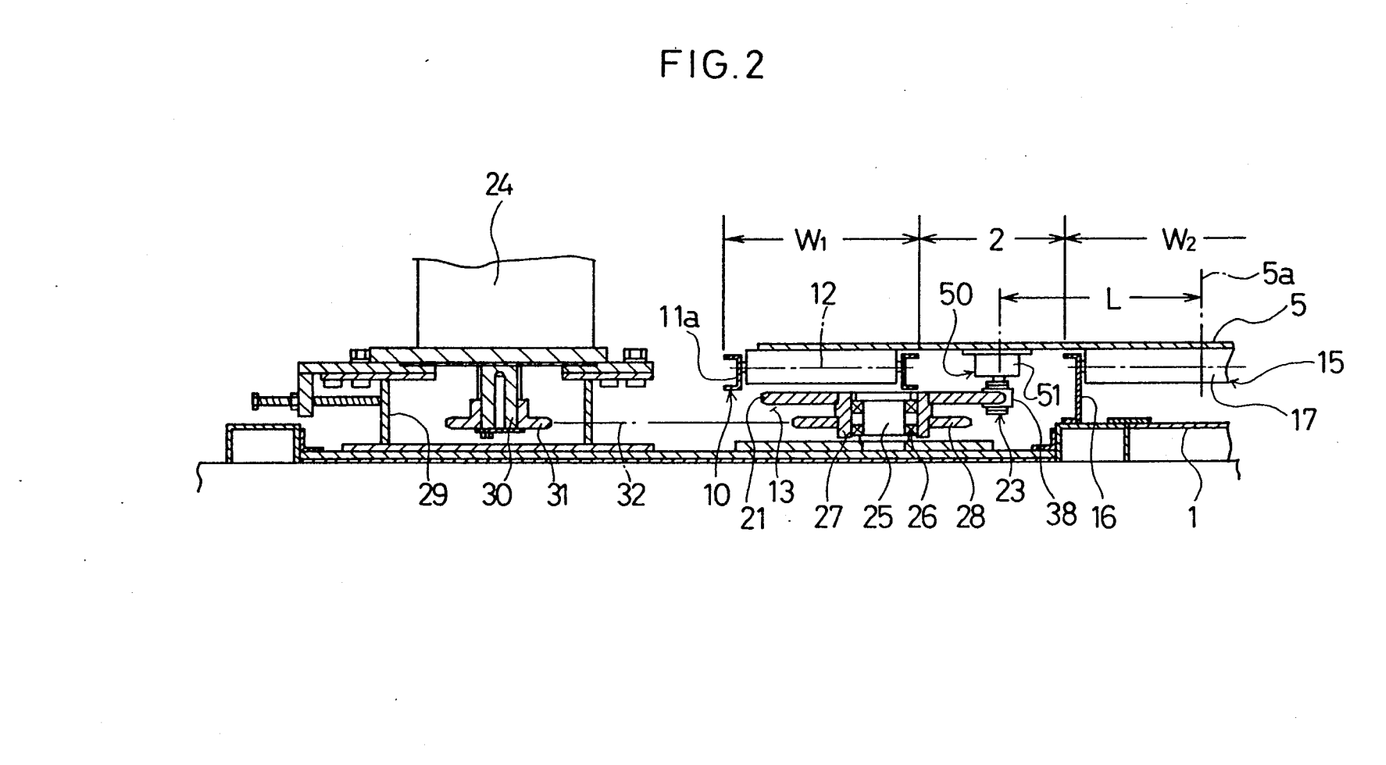
FIG. 2 is a sectional view showing the drive mechanism and peripheral components of the unit in FIG. 1.
Figure 3A:
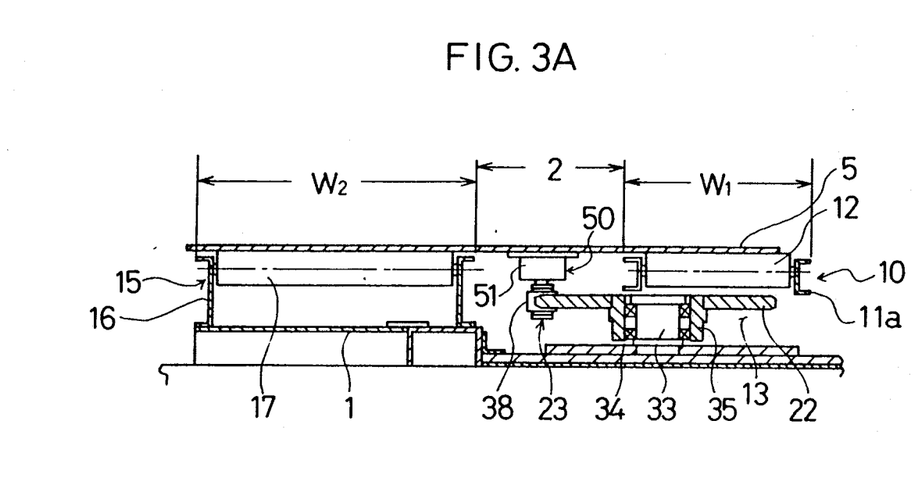
FIG. 3A is a sectional view of a driven portion of the unit of FIG. 1.
Figure 3B:
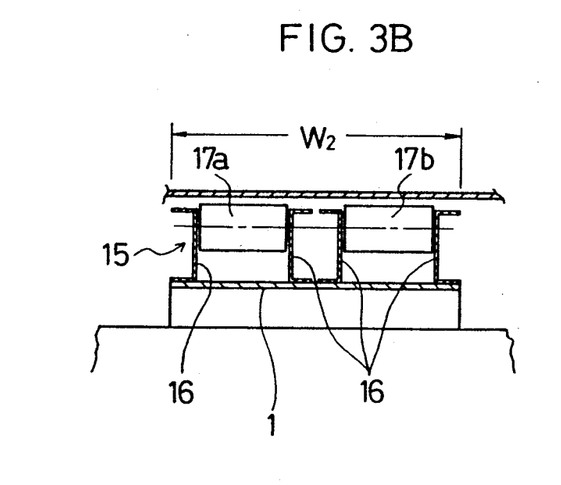
FIG. 3B is a sectional view showing a modified form of the portion shown in FIG. 3A.
Figure 4:
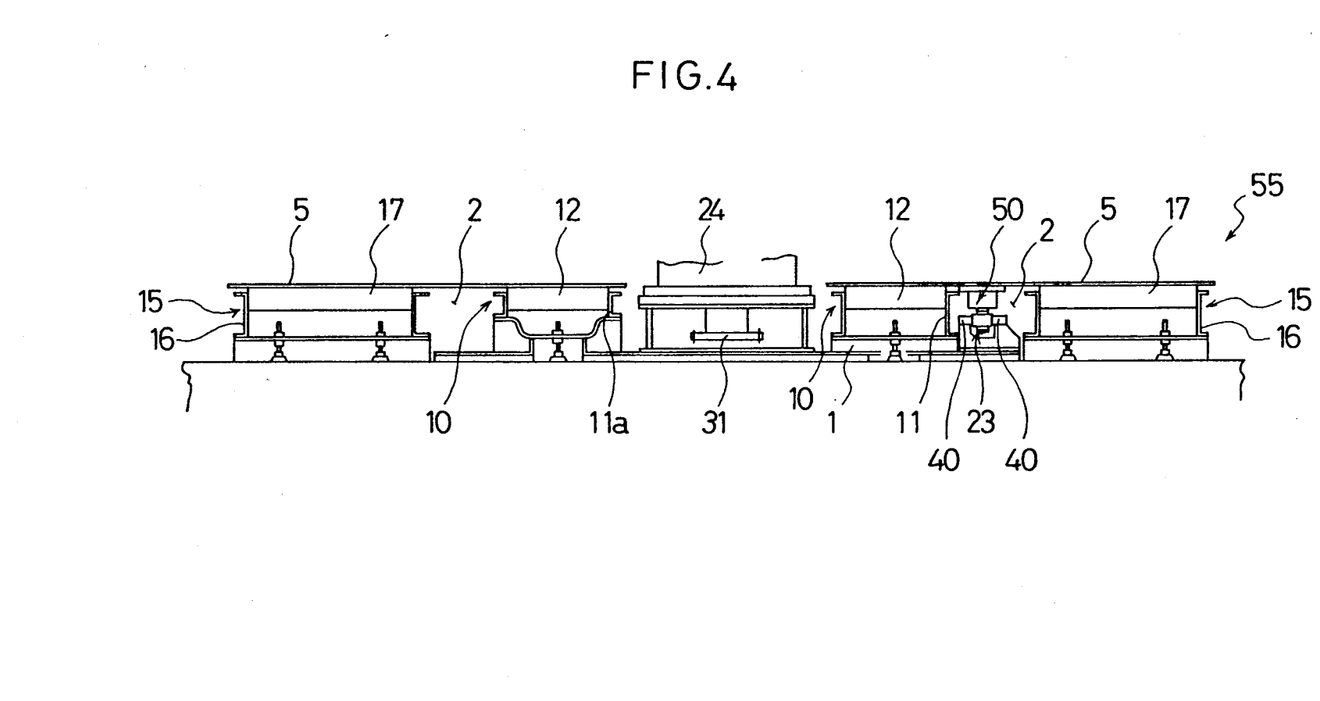
FIG. 4 is a cross-sectional view of the unit shown in FIG. 1.
Figure 5:
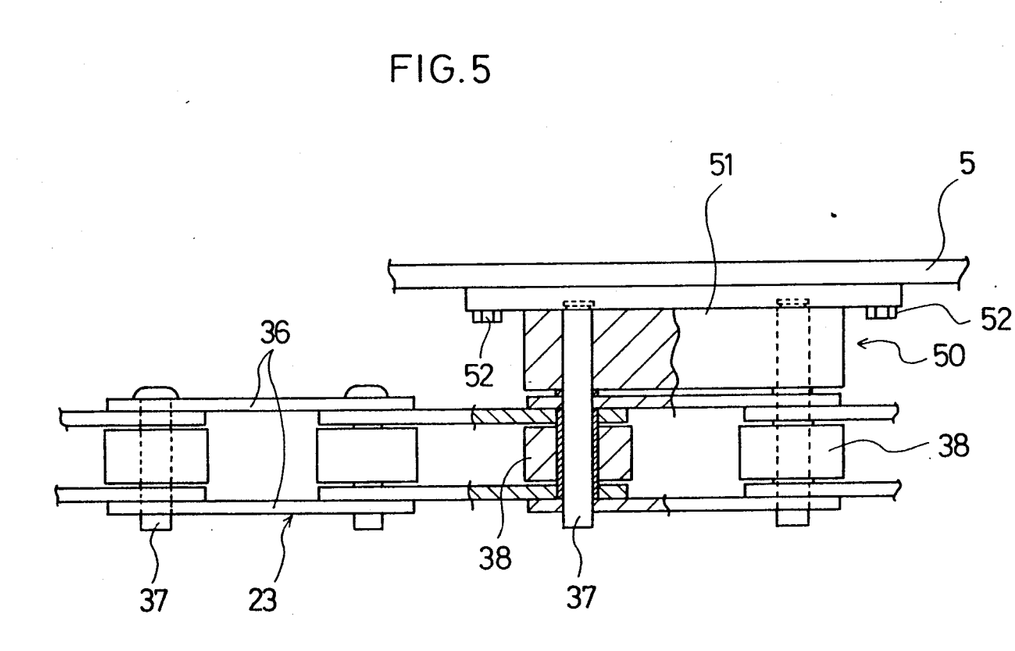
FIG. 5 is an enlarged view of connections in the unit of FIG. 1.
Figure 6:
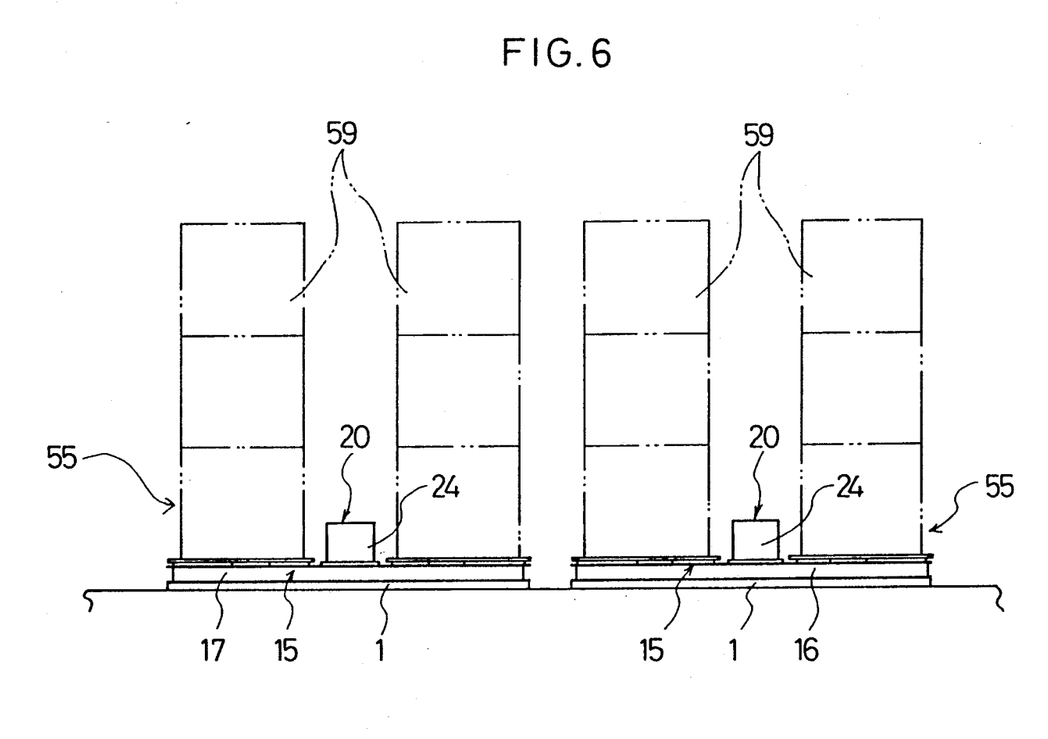
FIG. 6 is a schematic front view of an apparatus representing one embodiment of the invention which is equipped with same units as one shown in FIG. 1.
Figure 7:
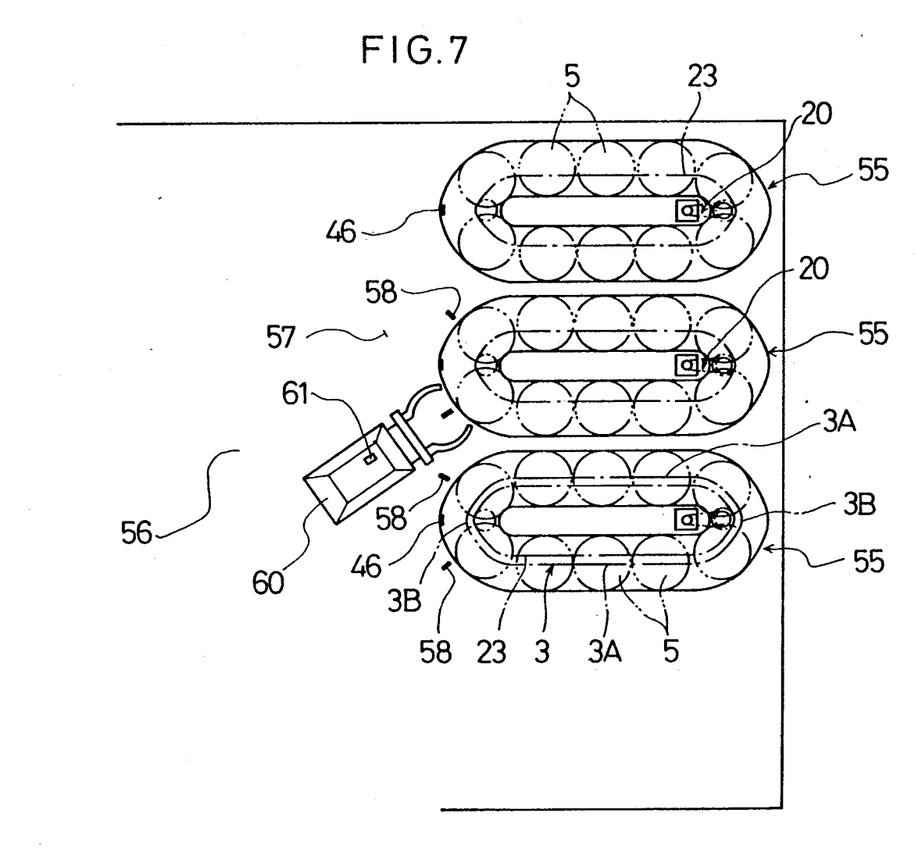
FIG. 7 is a schematic plan view of the apparatus of FIG. 6.

FIGS. 1 through 7 illustrate one embodiment of the invention. In FIGS. 1, 2 and 4, reference numeral 1 designates a long, flat frame-shaped base. On the upper surface of the base 1 there are mounted an endless inner support device 10, and an endless outer support device 15 extending along the outer periphery of the inner support device 10, with an endless clearance 2 defined between the support devices 10 and 15. These support devices 10, 15 define an elongate endless transport path 3 including a pair of parallel straight portions 3A and arcuate portions 3B which interconnect the beginning ends and terminal ends respectively of the straight portions, as shown in FIG. 7.

As FIGS. 1, 2, 3A, and 4 show, the inner support device 10 comprises a pair of endless frames 11 fixedly disposed double on the base 1 and a multiplicity of rollers 12 free-rotatably arranged between the frames 11. Likewise, the outer support device 15 comprises a pair of frames 16 fixedly disposed double on the base 1 and a multiplicity of rollers 17 free-rotatably arranged between the frames 16.

Outer support device 15 portions at opposite extremities of the elongate transport path 3 have a turn-round portion formed therein which projects centrally outward when viewed in plan. Thus, the turn-round portion has, at both sides of its center line, corner portions formed as cut portions 4. The width $W_2$ of the outer support device 15 is greater than the width $W_1$ of the inner support device 10. The support devices 10, 15 are of the roller conveyor type, but they may be of such other type as the belt conveyor type.

As FIG. 3A shows, rollers of the outer support device 15 are comprised of a single member over their entire length. Alternatively, they may be such that each roller is longitudinally split into halves, i.e., rollers 17a, 17b as shown in FIG. 3B, or may be of the multi-split type.

A plurality of disc-shaped article support elements 5 (for example, ten in number as shown in FIG. 7) are placed over the pair of support devices 10, 15, the article support elements 5 being movable on the transport path 3 in succession to one another. A drive mechanism 20 to which the article support elements 5 are geared is provided on the base 1 side.

The drive mechanism 20 comprises a pair of sprockets 21, 22 disposed in the arcuate portions 3B, below the inner support device 10, a chain 23 extending along the clearance 2 and trained between the sprockets 21 and 22, and a motor 24 geared to the one sprocket 21 and capable of being driven forward and reverse.

At each of the arcuate portions 3B in particular, the inner support device 10 includes a frame 11 for which a relatively short, low-height frame 11a is used, there being defined a space 13 between the underside of the inner support device 10 and the upper surface of the base 1.

As FIGS. 1 and 2 show, in one of the spaces 13 is disposed a support shaft 25 which extends upward from the base 1, and a sleeve 27 is rotatably fitted on the support shaft 25 through a bearing 26.

The sprocket 21 is securely fitted on the top of the sleeve 27, and a follower sprocket 28 is securely fitted on a middle portion of the sleeve 27.

A trestle 29 is disposed on the base 1 between the pair of straight portions 3A at a location adjacent the junction between the one arcuate portion 3B and the straight portions 3A. Mounted on the trestle 29 is the motor 24 with its rotary shaft 30 positioned to face downward. A chain 32 for power transmission is trained between a drive sprocket 31 fixed to the rotary shaft 30 and the follower sprocket 28.

As FIG. 3 shows, in the other space 13 is disposed a support shaft 33 which extends upward from the base 1 and on which a sleeve 35 is rotatably fitted through a bearing 33. The sprocket 22 is fixedly fitted on the top of the sleeve 35.

The chain 23 trained between the sprockets 21 and 22 is comprised of a roller chain having links 36, link pins 37, and rollers 38, as shown in FIG. 5. The chain 23 is guided, in the straight portions 3A, between the frames 11 and 16 defining the clearance 23 and, in the arcuate portions 3B, its component rollers 38 are guided by arcuate guide rails 40 extending to a location adjacent to the sprocket 21, 22.

The drive mechanism 20 consists essentially of the foregoing components 21 through 38 and is controlled by a control device 45 into actuation, operation stop, and forward and reverse operation. A receiver 46 is disposed at least at longitudinally oriented one end of the base 1, the receiver 46 being connected to the control device 45.

As may be seen from FIGS. 1, 2 and 3, each article support element 5 is connected, at a position deviated inwardly of the transport path 3 by a predetermined distance L from its center 5a, to the chain 23 by a coupling member 50 positioned in the clearance 2 between the support devices 10 and 15. More particularly, a bracket 51 is fixed through a bolt 52 to the underside of the article support element 5 at a position deviated from the center thereof, a corresponding one of the link pins 37 being coupled to the bracket 51. The coupling member 50 may be of some other type than the one having such elements as bracket 51 and bolt 52.

A plurality of article storing units 55 of the rotary type are arranged in parallel in a warehouse 56 in such a manner that their respective cut portions 4 are positioned adjacent to one another, as shown by way of example in FIGS. 6 and 7. A working space 57 is provided opposite to a given set of such parallel storing units 55, and a location in the working space 57 which is opposite to each cut portion 4 is set as a receiving/discharging station 58. Loading and unloading of articles 59 onto and from each article support element 5 are performed by, for example, a clamp-type fork lift truck 60. The fork lift truck 60 is equipped with a remote control switch 61 for application of a control signal to the receiver 46.

These article storing units 55 can be closely arranged in parallel in the warehouse 56 by positioning their respective cut portions 4 adjacent to one another, it being thus possible to minimize the working space 57 provided in opposed relation to each set of parallel storing units.

When article 59 is to be discharged from the article storing units 55 arranged in this way, an operator first causes the fork lift truck 60 to move in the working space 57 within the warehouse 56 and, meanwhile, he operates the remote control switch 61 to apply a control signal to the receiver 46 in a target one of the article storing units 55.

Thus, drive mechanism 20 is operated forward or reverse through the control device 45 of the target article-storing unit 55, so that the article support element 5 on which the target roll-shaped article 59 is placed in upright condition is caused to stop at a position opposite to the receiving/discharging station 58. In this way, the operator can operate the article storing unit 55 and perform loading and unloading of roll-shaped articles 57 relative to the article support element 5, without getting off the fork lift truck 60.

The motor 24 is started to drive the chain 23 via the rotary shaft 30, drive sprocket 31, power transmission chain 32, follower sprocket 28, sleeve 35, and sprockets 21, 22, and the force of chain 23 movement is transmitted to the article support elements 5 via the coupling members 50, whereby the article support elements 5 are set into movement.

The movement of the article support elements 5 is effected on the plurality of rollers 12, 17 in the pair of support devices 10, 15. Since rollers 12, 17 are arranged without omission, this movement is carried out in a substantially vibrationless condition in which the article support elements 5 are not subject to vibrations due to falling or the like factor. Thus, transport of roll-shaped articles is effected in stable and smooth condition at all times.

When the article support element 5 on which the target roll-shaped article is supported is stopped upon arrival at the receiving/discharging station 58, the coupling member 50 which connects the support element 5 to the chain 23 at a position deviated inwardly from the center 5a of the support element 5 is positioned in the space between the arcuate guide rails 40. Therefore, the article support element 5 is allowed to be sufficiently spaced from other support elements 5 adjacent thereto. Hence, although the pitch at which individual article support elements 5 are connected to the chain 23 is minimized, yet loading and unloading operations relative to the target support element 5 can be performed accurately and smoothly as desired. Further, considerable improvement in article storage efficiency can be obtained and, nevertheless, the article storing unit 55 as a whole can be made compact in construction.

The provision of a receiving/discharging station 58 relative to cut portions 4 permits a fork lift truck 60 to easily clamp the target roll-shaped article 59 for delivery outward. The efficiency of loading and unloading operations by the fork lift truck 60 can be thus enhanced. Entry of roll-shaped articles into storage on the target article support element 5 can be effected in a reverse way.

In the above described embodiment, each article support element 5 is disc shaped. Alternatively, it may be a polygonal plate. Sprockets 21, 22 are provided in one pair in the embodiment, but as an alternative, four sprockets are arranged in position so that the chain 23 may be moved in a rectangular fashion when viewed in plan.

Figure 8:
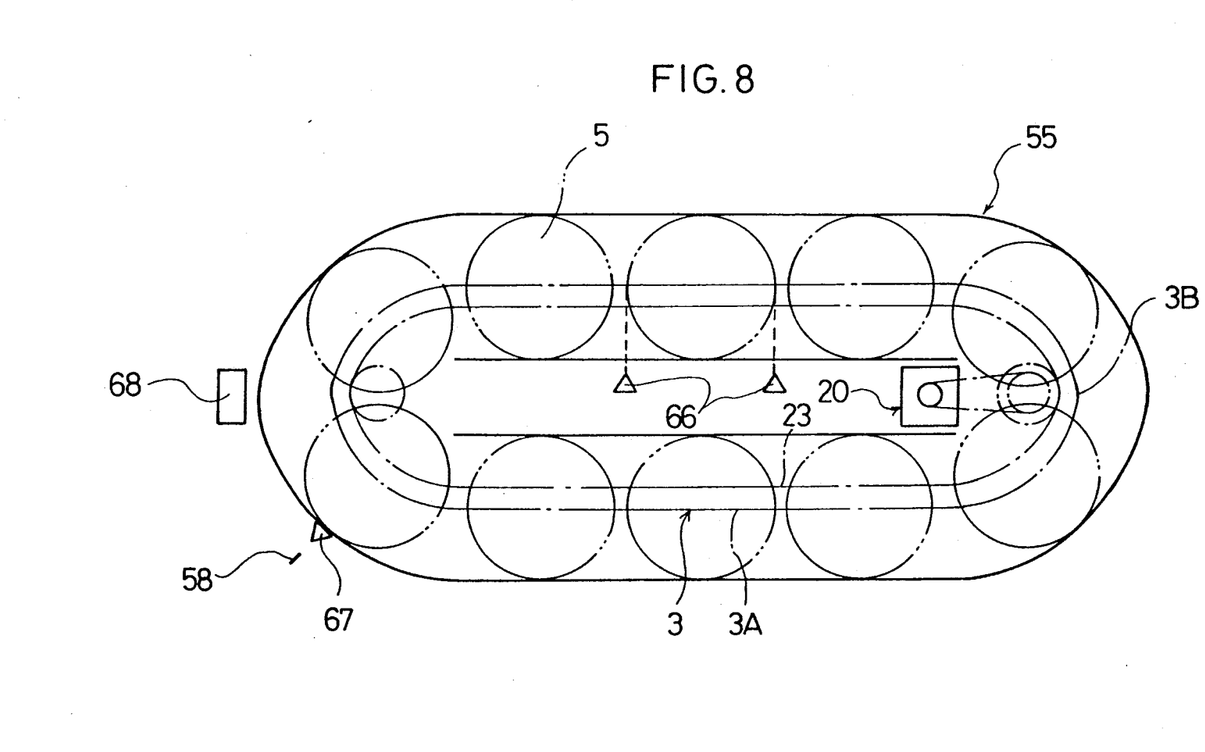
FIG. 8 is a plan view showing a storing unit in another embodiment of the invention.

FIGS. 8 to 13 illustrate another embodiment of the invention, wherein as FIG. 8 shows, there are provided a pair of photoelectric position switches 66 for detecting article support elements 5 in position, a drive select photoelectric switch 67 for detecting fork lift truck 60 at receiving/discharging station 58, and a slave control panel 68 disposed adjacent the receiving/discharging station 58.

Figure 10:
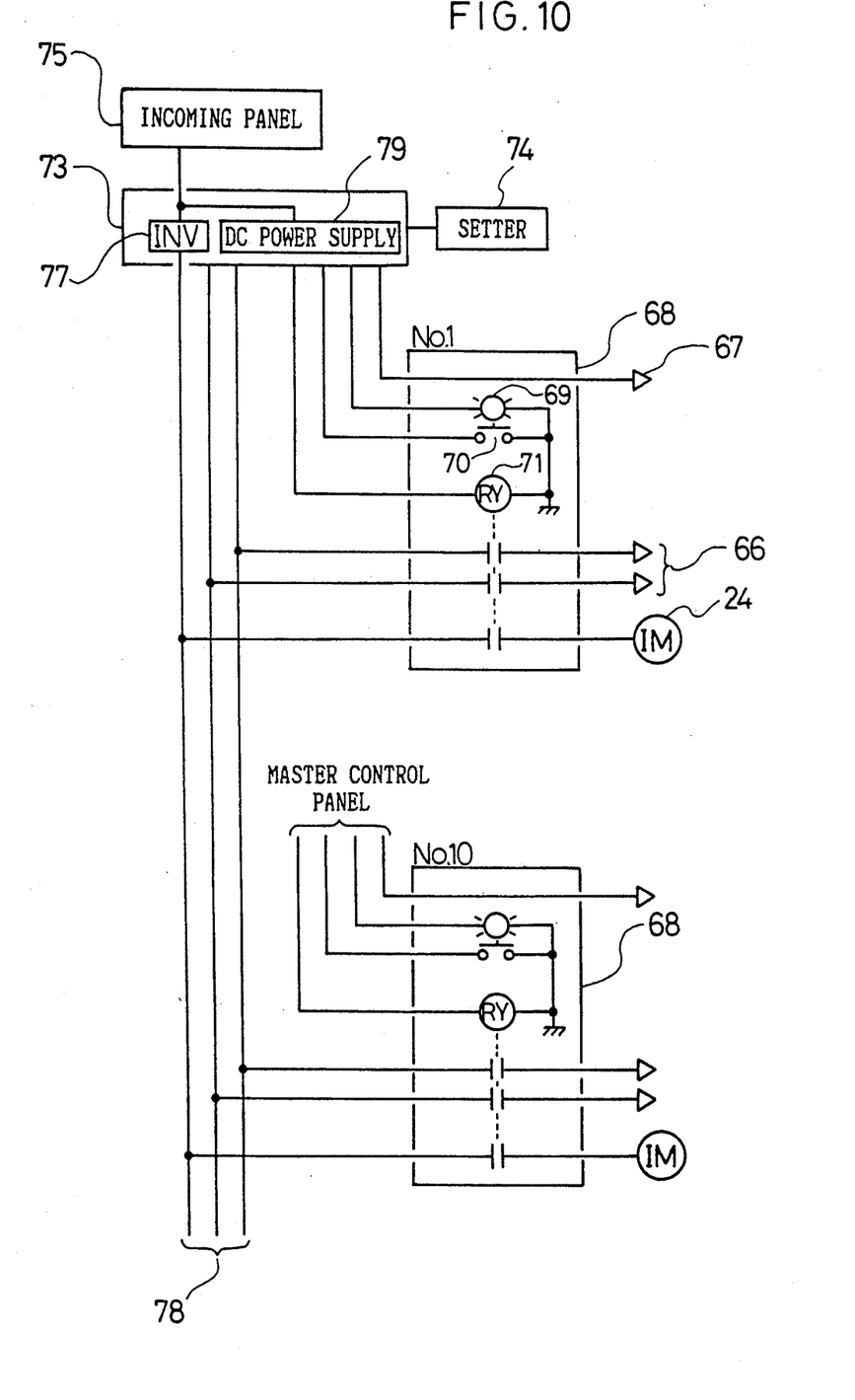
FIG. 10 is a diagram showing the arrangement of control system in the apparatus of FIG. 9.

In the slave control panel 68, as FIG. 10 shows, there are provided an operable condition display lamp 69 for displaying the arrival of the target article support element 5 at the receiving/discharging station 58, an operation end switch 70 for manipulation by operator at the end of loading and unloading operation with respect to roll-shaped articles 59, a photoelectric position switch 66, and a relay 71 for on/off switching of motor 24.

Figure 9:
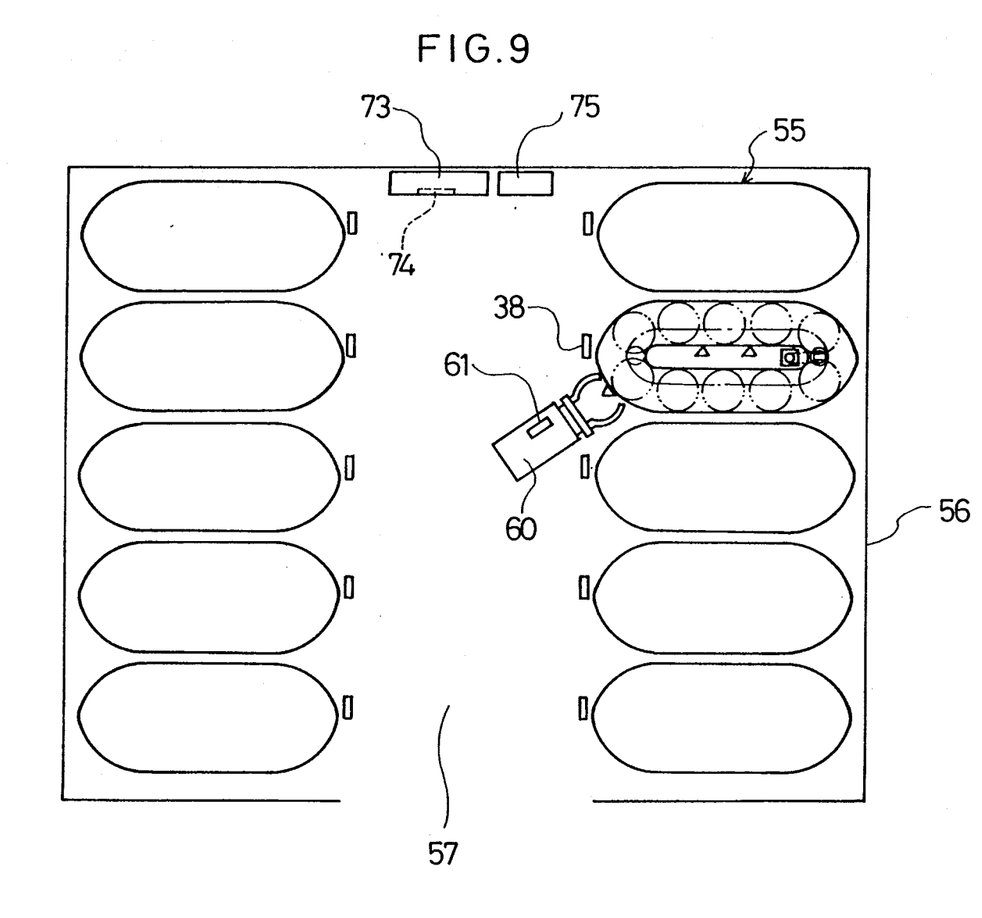
FIG. 9 is a schematic plan view of an apparatus representing another embodiment of the invention which is equipped with same units as one shown in FIG. 8.

In this embodiment, as FIG. 9 shows, the storing apparatus comprises ten article-storing units 55, a master control panel 73 for general control of the article storing units 55, a setter 74 connected to the master control panel 73, and an incoming panel 75. The incoming panel 75 is equipped with a voltage drop transformer, an overcurrent breaker, a DC power supply, etc. (which are not shown).

Figure 11:
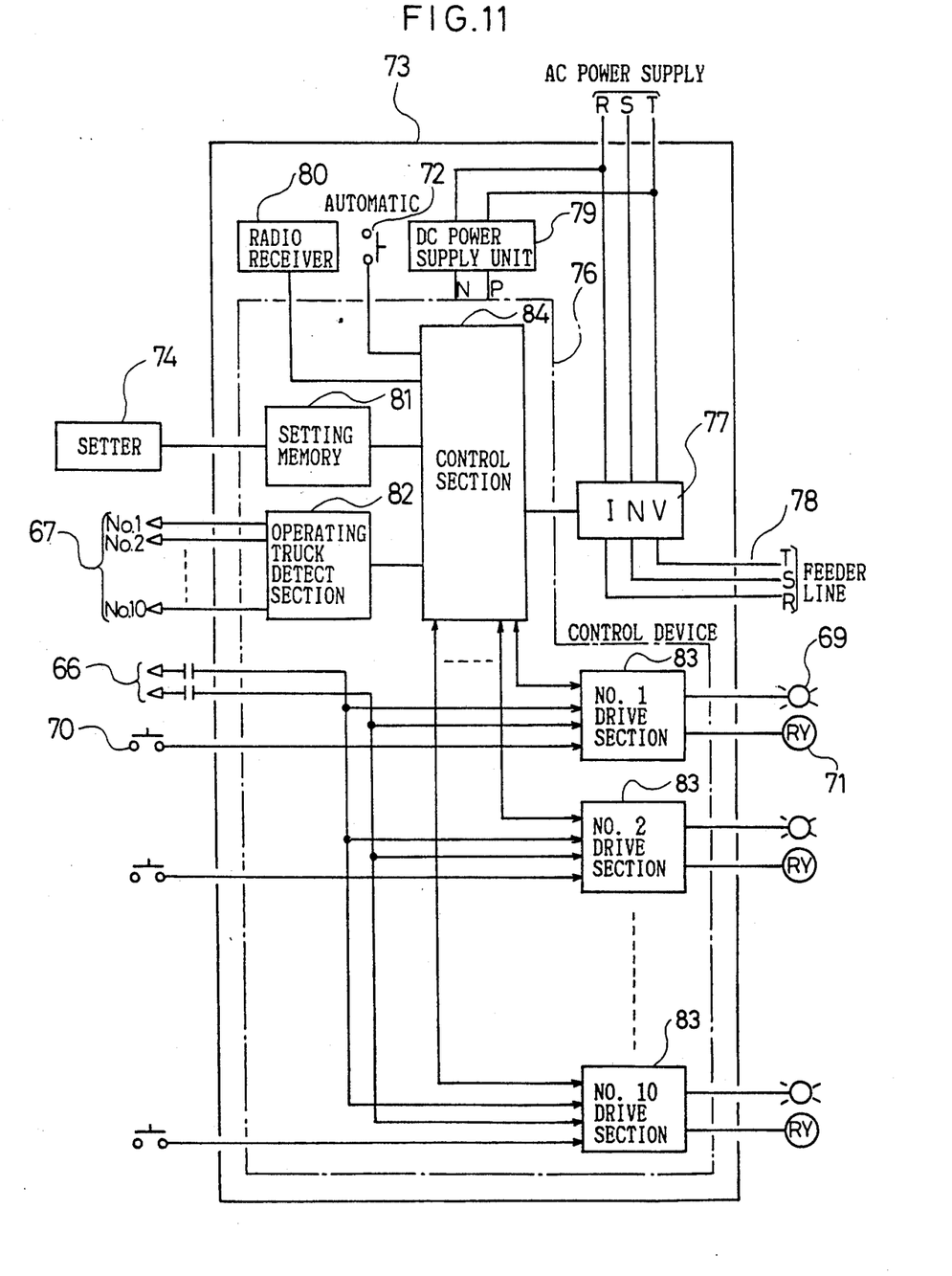
FIG. 11 is a block diagram showing the arrangement of internal system of a master control panel in FIG. 10.

The master control panel 73, as FIGS. 10 and 11 show, has an automatic switch 72 for selecting "auto-set", a control device 76 comprising a microcomputer, an inverter 77, a DC power supply 79 for supply of power to the control device 76, and a radio receiver 80 for receiving a drive signal from a remote control switch 61 set in fork lift truck 60. AC power for the inverter 77 and DC power supply 79 is supplied by the incoming panel 75. When the automatic switch 72 is not operated, that is, during manual operation, a drive signal from the remote control switch 61 is received into the control device 76. The master control panel 73 is connected to the slave control panel 68 of each article storing unit 55, and receives a detection signal from the drive select photoelectric switch 67, a detection signal from the photoelectric position switch 66 which is channeled through a normally open contact (hereinafter referred to as "a contact") of the relay 71, and an operating signal from the operation end switch 70. The master control panel 73 outputs a drive signal for the relay 71, and a lighting signal for the operable condition display lamp 69, and supplies power on a feeder line 78 to the motor 24 via other a contact of the relay 71.

The control device 76 in the master control panel 73 has a setting memory 81 for storing set values including numbers of article storing units 55 and numbers of article support elements 5. The control device 76 has a working vehicle detector section 82 which receives a detection signal from the drive select photoelectric switch 67 for detection of the receiving/discharging station 58 of a particular storing unit 55 at which the fork lift truck 60 is presently positioned, Nos. 1 to 10 drive sections 83 corresponding to slave control panels 68 of individual storing units 55, and a control section 84.

Figure 12:
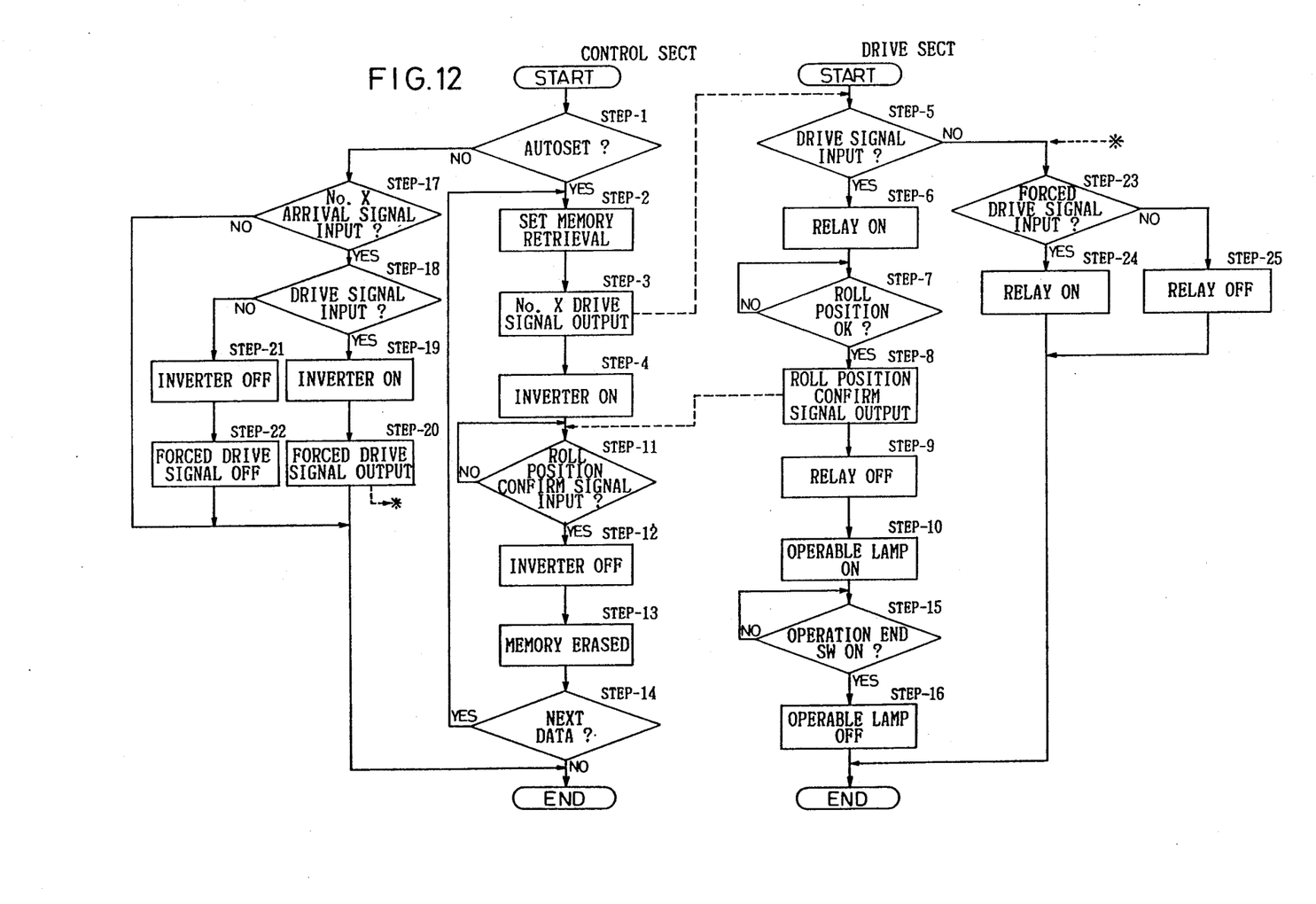
FIG. 12 is a flow chart illustrating the operation of the system shown in FIG. 11.

The manner of operation of the drive sections 83 and control section 54 will now be described with reference to the flow chart given in FIG. 12.

The control section 84, when it is determined that operation is automatically set by the automatic switch 72 (step-1), retrieves set values consiting of the number of the particular storing unit 55 and the number of the particular article support element 5 of the storing unit 55 from set values previously input to the set memory 81 by the setter 74 (step-2), and then outputs a drive signal consisting of a start command and the number of the storing unit 5 to the drive section 83 for the particular storing unit 55 designated by that number (step-3), and drives the inverter 77 (step-4). When it receives the drive signal (step-5), the drive section 83 turns on the relay 71, turns on the photoelectric position switch 66, and connects the motor 24 to the feeder line 78 to start movement of artcle support element 5 (step-6). When arrival of the target article support element 5 is determined by counting detection signals from the photoelectric position switch 66 (step-7), a roll position confirm signal is output to the control section 84 (step-8), and the relay 71 is turned off to stop movement of the article support selement 5 (step-9), the operable condition display lamp 69 being then caused to light up (step-10).

When the control section 84 inputs the roll position confirm signal (step-11), actuation of the inverter 77 is stopped (step-12); the set value under retrieval is erased from the setting memory 81 (step-13); and decision is made as to whether or not a next set value is present in the setting memory 81 (step-14). When it is determined that a set value is present, the control section returns to step 2 to initiate next operation. When it is determined that the operating switch 70 has been turned on (step-15), the drive section 83 causes the operable condition display lamp 69 to light off (step-16).

In the case where it is determined at step 1 that operation has not been set automatic, upon receipt from the working vehicle detecting section 82 of the number of the storing unit 55 with respect to which the fork lift truck 60 has arrived (step-17), decision is made as to whether a drive signal from the remote control switch 61 has been input from the radio receiver 80 (step-18). If so determined, then the inverter 77 is actuated (step-19), and a forced-drive signal is output to the drive section 83 of the storing unit 55 whose number has been input (step-20). If no drive signal is confirmed, the actuation of the inverter 77 is stopped (step-21), and outputting of a forced-drive signal is halted (step-22).

When the drive section 83 determines that a forced drive signal has been input (step-23), it turns on the relay 71, turns on the photoelectric position switch 66, and causes the motor 24 to be connected to the feeder line 78 to initiate movement of article support elements 5 (step-24). In the case of input of a forced drive signal being not determined, the relay 71 is turned off to stop movement of article support elements 5 (step-25).

For the purpose of receiving and discharging of articles into and from the article storing unit 55, the operator first causes the setter 74 to input a set value into the control device 76 of the master control panel 73. Set value may be in plurality. Selection is made of automatic control or manual control by means of the automatic switch 72.

In the case of automatic control, the control device 76 of the master control panel 73 drives the relay 71 and in turn the drive mechanism 20 on the basis of the set value, to thereby stop the article support element 5 on which the target article 59 is placed upright as it reaches a position opposite to the receiving/discharging station 58, the operable condition display lamp 69 being caused to light up. Upon lighting being confirmed of the display lamp 69, the operator operates the fork lift truck 60 to perform loading and unloading operation with respect to the article support element 5. At the end of the operation, the operator manipulates the operation end switch 70. Then, the display lamp 69 lights off and the executed set value is erased. Where a plurality of set values are present, the storing units 55 are driven one after another according to the order in which they have been set. When one of them arrives at the specified position, the display lamp lights and operation is effected on the basis of a next set value. This operation is repeated as long as set values are present.

In the case of manual operation, the operator moves the fork lift truck 60 within the working space 57 in the warehouse 56, and stops the fork lift truck 60 when it reaches a position opposite to the receiving/discharging station 58 for the storing unit 55 relative to which loading and unloading operation is to be carried out. The remote control switch 61 is operated to issue a drive signal, and during the period in which the drive signal is received, the control device 76 of the master control panel 73 actuates the relay 71 of the storing unit 55 with respect to which the fork lift truck 60 is stopped, whereby the drive mechanism 20 is actuated to move the article support element 5.

When the article support element 5 subject to loading and unloading operation is positioned in corresponding relation to the receiving/discharging station 58, the operator turns off the remote control switch 61, whereupon the control device 76 of the master control panel 73 turns off the relay 71 of the storing unit 55 with respect to which the fork lift truck 60 is at its stop position, thereby to stop movement of the article support element 5. As a consequence, the target article support element 5 is stopped in opposed relation to the receiving / discharging station 58, and the operator controls the fork lift truck 60 with respect to the article support element 5 for loading and unloading operation.

Article receiving and discharging operation can be performed in this way and, in this connection, it is understood that the control device 76 is controlled so that out of the ten storing units 55 only one unit is operated constantly at a time. Therefore, the electric capacity required for supply through the incoming panel 75 to the whole article storing apparatus may be no more than electric capacity necessary for driving one storing unit 75 at all times. Thus, the incoming electric capacity for the entire storing apparatus can be minimized and, in addition, necessary cost for installation of the incoming panel 75 and related equipment is relatively low.

Figure 13:
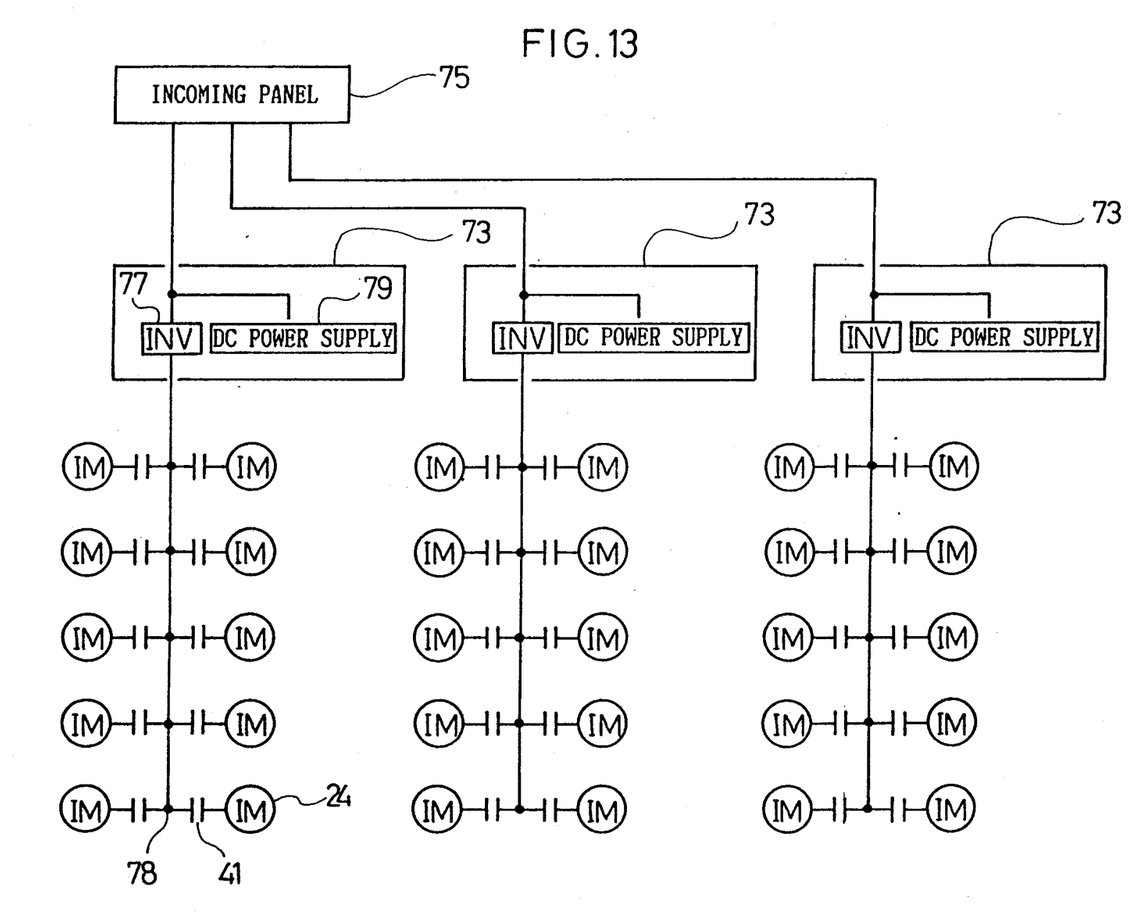
FIG. 13 is a view showing a modified form of the apparatus shown in FIG. 9.

In the foregoing embodiment, the article storing apparatus has ten storing units 55; but it is noted that where thirty storing units 55 are installed, for example, as shown in FIG. 13 (in which they are represented by motors 24), a master control panel 73 may be provided for each set of units (ten units are shown). In this way, the number of rotary article-storing units operated at all times can be limited to same as the number of the master control panel 73 and, therefore, the required incoming electric capacity may be an electric capacity for this number of units, so that considerable economy can be assured with respect to the cost for installation of necessary incoming equipment.

What is claimed is:

1. An apparatus for storing articles including rotary storing units having an elongate endless transport path formed on a long frame-shaped base, comprising:
   a plurality of said storing units arranged in parallel, each having corner portions at one end of its elongate structure which are formed as a receiving/discharging station,
   each storing unit including:
      inner support means provided on the upper surface of said base and defining a first endless transport path,
      outer support means provided on the upper surface of said base and extending along the outer periphery of the inner support means, said outer support means defining a second endless transport path,
      an endless clearance defined between said inner support means and said outer support means,
      drive means disposed below said support means,
      an endless movable member provided below said support means at a position corresponding to said clearance and adapted to be driven by said drive means,
      a plurality of article support elements supported on said inner and outer support means, and
      means connecting said article support elements and said movable member through said clearance.

2. An apparatus as set forth in claim 1, wherein the inner and outer support means each include a plurality of idler rollers for supporting said article support elements, said idler rollers forming said transport path.

3. An apparatus as set forth in claim 1, wherein the article support elements are supported by the inner and outer support means over respective full widths thereof, the width of the outer support means being greater than the width of the inner support means, each of the article support elements being connected to said travel element at a position located more inward of said transport path than the center of the article support element.

4. An apparatus as set forth in any one of claims 1 to 3, further comprising:
   switching means provided in each of the storing units for switching the drive means in the storing unit,
   means for feeding power to drive means in a predetermined number of said storing units through respective switching means of said predetermined number of storing units, and
   control means for operating the switching means of one of said predetermined number of storing units to actuate the drive means of said one storing unit only.

* * * * *